US010293523B2

(12) United States Patent
Wang et al.

(10) Patent No.: US 10,293,523 B2
(45) Date of Patent: May 21, 2019

(54) DEVICE AND METHOD FOR SHEET FLEXIBLE-DIE FORMING BASED ON MAGNETORHEOLOGICAL ELASTOMER

(71) Applicant: Harbin Institute of Technology, Harbin, Heilongjiang Province (CN)

(72) Inventors: Zhongjin Wang, Harbin (CN); Pengyi Wang, Harbin (CN); Xiao Luo, Harbin (CN)

(*) Notice: Subject to any disclaimer, the term of this patent is extended or adjusted under 35 U.S.C. 154(b) by 41 days.

(21) Appl. No.: 14/899,339

(22) PCT Filed: Apr. 30, 2014

(86) PCT No.: PCT/CN2014/076689
§ 371 (c)(1),
(2) Date: Dec. 17, 2015

(87) PCT Pub. No.: WO2014/201913
PCT Pub. Date: Dec. 24, 2014

(65) Prior Publication Data
US 2016/0158974 A1 Jun. 9, 2016

(30) Foreign Application Priority Data

Jun. 19, 2013 (CN) .......................... 2013 1 0244291

(51) Int. Cl.
*B29C 51/00* (2006.01)
*B29C 43/00* (2006.01)
(Continued)

(52) U.S. Cl.
CPC ............ *B29C 43/003* (2013.01); *B29C 43/02* (2013.01); *B29C 43/58* (2013.01); *B29C 51/002* (2013.01);
(Continued)

(58) Field of Classification Search
CPC .............................. B29C 43/003; B29C 43/02
See application file for complete search history.

(56) References Cited

U.S. PATENT DOCUMENTS

| 4,248,545 A * | 2/1981 | Andersen ............... B21D 24/04 403/223 |
| 2005/0211870 A1* | 9/2005 | Browne ................ B29C 33/308 249/134 |

(Continued)

FOREIGN PATENT DOCUMENTS

IN 2280 CHE 2012 A * 7/2012 ............. H01F 41/00

OTHER PUBLICATIONS

Evans, Benjamin A., et al. "A highly tunable silicone-based magnetic elastomer with nanoscale homogeneity." Journal of magnetism and magnetic materials 324.4 (2012): 501-507. <http://www.sciencedirect.com/science/article/pii/S0304885311006214>.*

(Continued)

*Primary Examiner* — Robert C Dye
*Assistant Examiner* — Nicholas R Krasnow
(74) *Attorney, Agent, or Firm* — Novoclaims Patent Services LLC; Mei Lin Wong

(57) ABSTRACT

A flexible-die forming apparatus includes a piston, a coil, an upper die, a magnetorheological elastomer, and a lower die having a cavity formed thereon. The upper die is arranged to be overlappedly rested on top of the lower die. The piston is movably received in the receiving cavity of the upper die. The magnetorheological elastomer is mounted at a lower portion of the piston, and is received in the receiving cavity of the upper die. The coil is provided and wounded on an exterior surface of the upper die and the lower die.

6 Claims, 4 Drawing Sheets

(51) Int. Cl.
*B29C 51/08* (2006.01)
*B29C 43/02* (2006.01)
*B29C 43/58* (2006.01)
*B29K 105/00* (2006.01)
*B29C 43/36* (2006.01)

(52) U.S. Cl.
CPC ............ *B29C 51/085* (2013.01); *B29C 43/36* (2013.01); *B29C 2043/3628* (2013.01); *B29C 2043/3652* (2013.01); *B29C 2043/3655* (2013.01); *B29C 2043/5808* (2013.01); *B29K 2105/256* (2013.01); *B29K 2905/12* (2013.01); *B29K 2995/0008* (2013.01)

(56) References Cited

U.S. PATENT DOCUMENTS

| | | | | |
|---|---|---|---|---|
| 2008/0318045 | A1* | 12/2008 | Bose | F16F 1/361 428/402 |
| 2011/0113845 | A1* | 5/2011 | Bose | B21C 9/00 72/43 |
| 2012/0153531 | A1* | 6/2012 | Rober | B29C 43/10 264/225 |
| 2016/0031091 | A1* | 2/2016 | Popovic | A61B 17/29 294/192 |

OTHER PUBLICATIONS

Rösel, Sebastian, and Marion Merklein. "Flow behaviour of magnetorheological fluids, considering the challenge of sealing in blank hydroforming in the flange area with rectangular leakage area cross-sections." Key Engineering Materials. vol. 473. Trans Tech Publications, 2011. (Year: 2011).*

Merklein, M., and S. Rösel. "Characterization of a magnetorheological fluid with respect to its suitability for hydroforming." International Journal of Material Forming 3.1 (2010): 283-286. (Year: 2010).*

* cited by examiner

DEVICE AND METHOD FOR SHEET FLEXIBLE-DIE FORMING BASED ON MAGNETORHEOLOGICAL ELASTOMER

BACKGROUND OF THE PRESENT INVENTION

Field of Invention

The present invention relates to a flexible-die forming apparatus and method for sheet metal, and more particularly to a sheet flexible-die forming apparatus and method by using magnetorheological elastomer as a flexible-die.

Description of Related Arts

Rubber-forming (including polyurethane rubber forming) is a well-known and widely-utilized manufacturing method. Silicon rubber and polyurethane rubber have a number of superior mechanical properties such as large hardness range, high elasticity, or high material strength. These properties make them extremely suitable as a flexible-die for rubber-forming. Different compositions of raw material and manufacturing methods determine the ultimate quality of the resulting rubber. Among many material properties, elasticity modulus is a very important material property which affects the quality of resulting products.

Conventionally, in rubber-forming a manufacturer needs to, depending on the material property and shape characteristics of desirable products, select a kind of rubber which has the most suitable elasticity modulus as flexible-die. However, the deformation and stress states of sheet metal changes during the forming process. During initial forming stage, the rubber should possess a relatively higher elasticity modulus (i.e. generally harder) to provide larger force with the same deformation. During later stage, the rubber should possess a relatively lower elasticity modulus (i.e. generally softer). When the rubber is softer, it can flow easily into the cavity and ensure the sheet to achieve the desired shape, which is especially important for forming the products with small radius curved surface. Unfortunately, conventional rubber does not possess the above-mentioned property during a typical rubber-forming process. The elasticity modulus remains constant throughout the entire forming process. This disadvantage substantially hinders the development of rubber-forming. If, it is possible to alter the elasticity modulus of the rubber during a typical forming process, the sheet metal flow can be adjusted and optimized, and the formability of sheet metal and the quality of the products would be substantially improved.

New material developed in recent years provides a possibility for resolving the above-mentioned problem. Magnetorheological elastomer is a very promising smart material, which is a class of solids that consist of polymeric matrix with embedded micro-sized ferromagnetic particles. Because of this particular composite microstructure, the mechanical properties (such as elasticity modulus) of these materials can be altered by the application of magnetic field. This smart material is more controllable, having rapid response in changing mechanical properties, superior material stability during a typical forming process. The change in mechanical properties for this material is also reversible. Currently, many scholars are researching the applicability of magnetorheological elastomer in noise abatement and control of motor vehicles, trains and ships. Among all magnetorheological elastomers, magnetorheological elastomer with silicone rubber or polyurethane rubber as polymeric material have been widely utilized. The elasticity modulus of the magnetorheological elastomer by using silicone rubber or polyurethane rubber as polymeric material can be altered by adjusting the applied external magnetic field strength.

SUMMARY OF THE PRESENT INVENTION

An objective of the present invention is to provide a rubber-forming apparatus and method by using magnetorheological elastomer, in which a property of rubber can be optimally altered to enhance the quality of the resulting product.

In one aspect of the present invention, it provides a sheet flexible-die forming apparatus, comprising:

a piston, a coil, an upper die, a magnetorheological elastomer, and a lower die having a cavity formed thereon, the upper die being arranged to be overlappedly rested on top of the lower die, the piston being movably received in the receiving cavity of the upper die, the magnetorheological elastomer being mounted at a lower portion of the piston, and received in the receiving cavity of the upper die, the coil being provided and wounded on an exterior surface of the upper die and the lower die.

The present invention also provides a method of carrying out sheet forming using magnetorheological elastomer material as a flexible-die, comprising the steps of:

(1) disposing a sheet blank onto a lower die at a position between the lower die and an upper die, wherein the sheet blank is secured at a boundary between the lower die and an upper die;

(2) determining a magnetic field strength B in the receiving cavity of the upper die according to a cross sectional shape of the sheet blank and a desirable elasticity modulus of the magnetorheological elastomer, where:

$$B=\mu_0 nI$$

where $\mu_0$ is vacuum permeability, n is the number of turns for a unit length of the coil, I is current, the magnetic field strength B not exceeding a saturation value of the magnetorheological elastomer;

(3) connecting the coil to an external direct current power source, and adjusting a current to alter the magnetic field developed in the receiving cavity of the upper die so as to alter the elasticity modulus of the magnetorheological elastomer, wherein the sheet blank is deformed into the desired shape under the action of the magnetorheological elastomer with a predetermined elasticity modulus; and (4) removing the piston and the upper die from the lower die, and retrieving a final product.

Advantageous Effects of the Present Invention

The present invention has the following advantageous effects:

1. The present invention utilizes the magnetorheological elastomer as a flexible-die in sheet flexible-die forming. The magnetorheological elastomer is magnetorheological elastomer with silicone rubber or polyurethane rubber as polymeric material. The former is a material which consists of silicone rubber as a polymeric matrix with embedded micro-sized ferromagnetic particles. The latter is a material which consists of polyurethane rubber as a polymeric matrix with embedded micro-sized ferromagnetic particles. The magnetorheological elastomer 4 has alterable elasticity modulus under different magnetic field strength. By adjusting an externally applied direct current, the magnetic field strength can be altered so as to achieve an optimal elasticity modulus for the magnetorheological elastomer. The elasticity modulus of the magnetorheological elastomer in turns affects the forming quality of the products.

2. The present invention alters the elasticity modulus of the magnetorheological elastomer during different stages of a typical forming process so as to optimize the deformation of the sheet metal during the forming process.

3. By using and smartly controlling a magnetorheological elastomer for forming a product from a sheet blank, the present invention allows the intelligent control and precision forming of a final products which have relatively complicated shapes.

DETAILED DESCRIPTION OF THE PREFERRED EMBODIMENT

Figure 1:
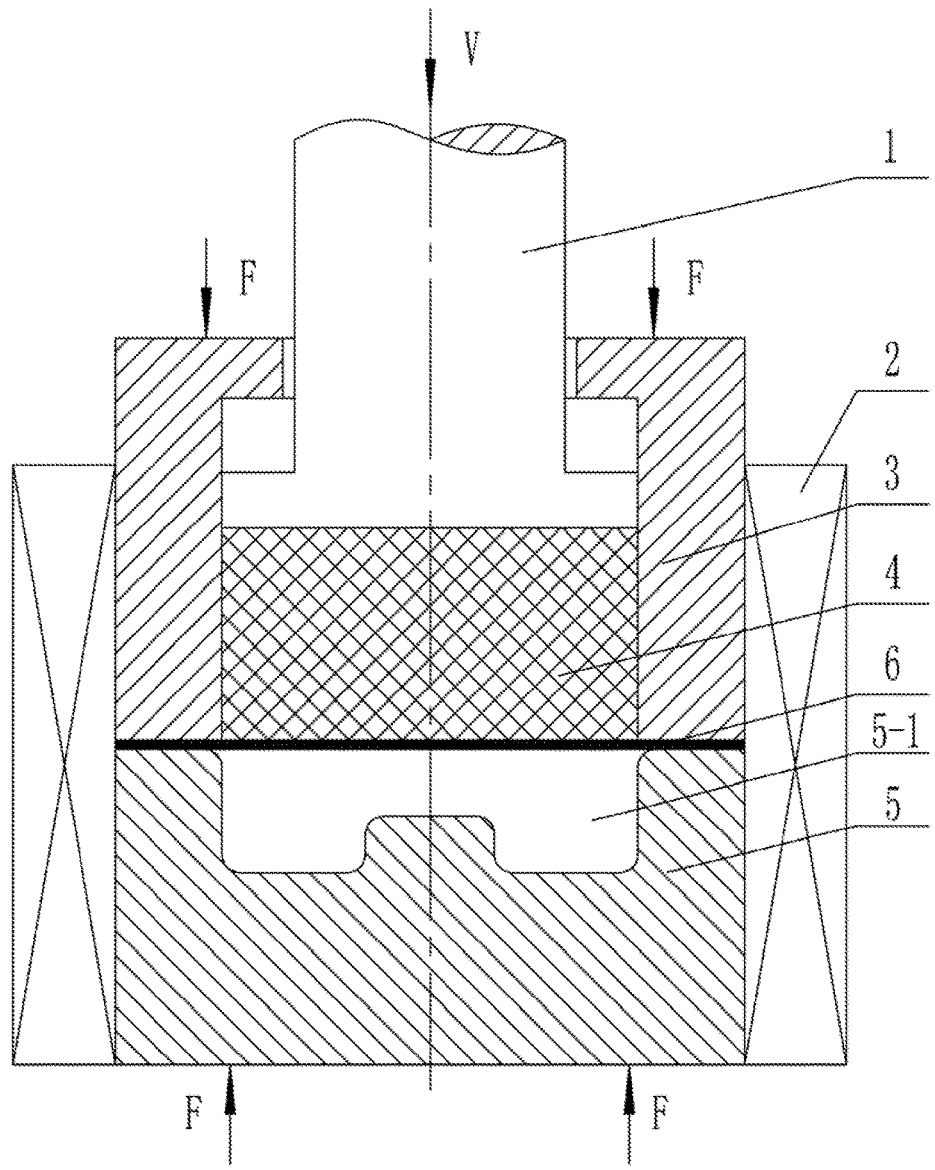
FIG. 1 is a sectional view of a forming apparatus according to a preferred embodiment of the present invention, illustrating an initial stage of a deep drawing process.
Figure 2:
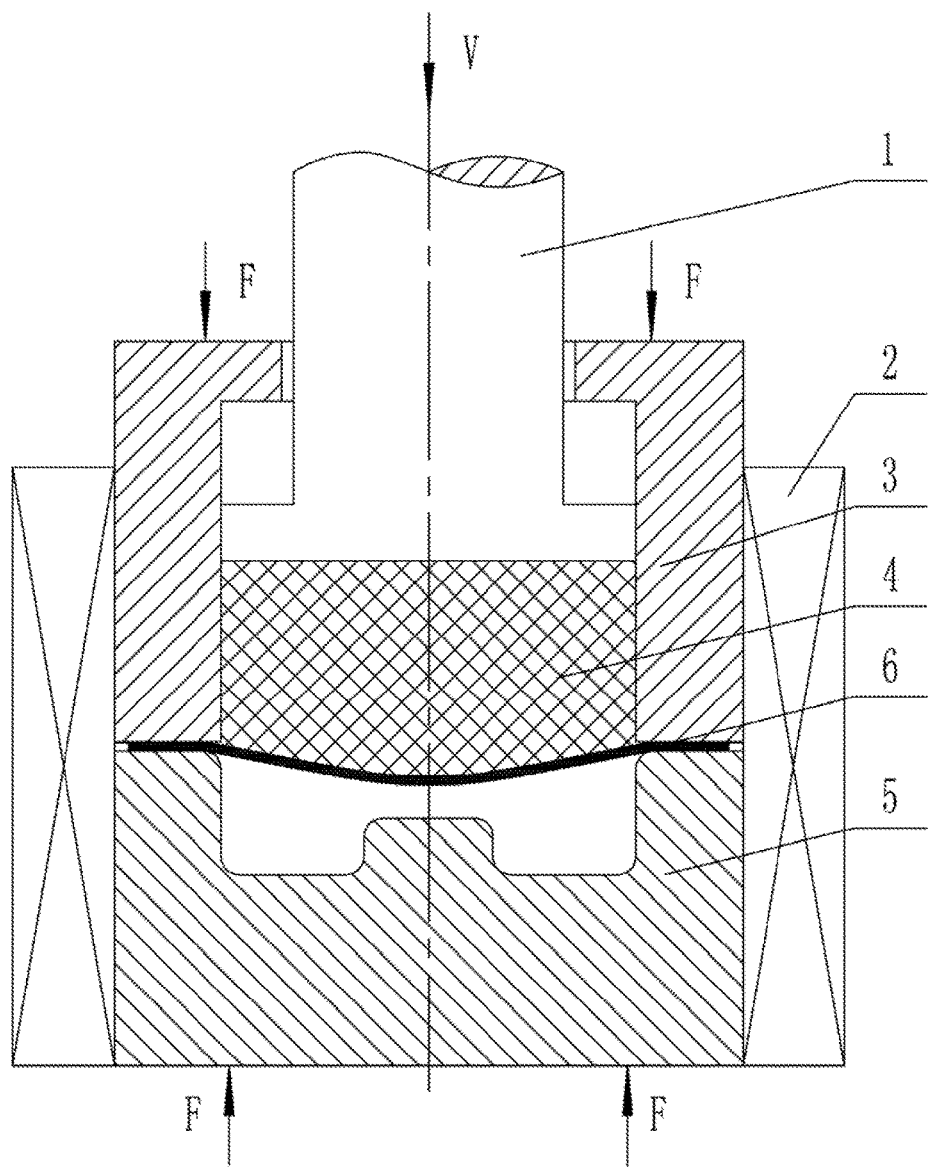
FIG. 2 is a sectional view of the forming apparatus according to the preferred embodiment of the present invention, illustrating a middle stage of the deep drawing process.
Figure 3:
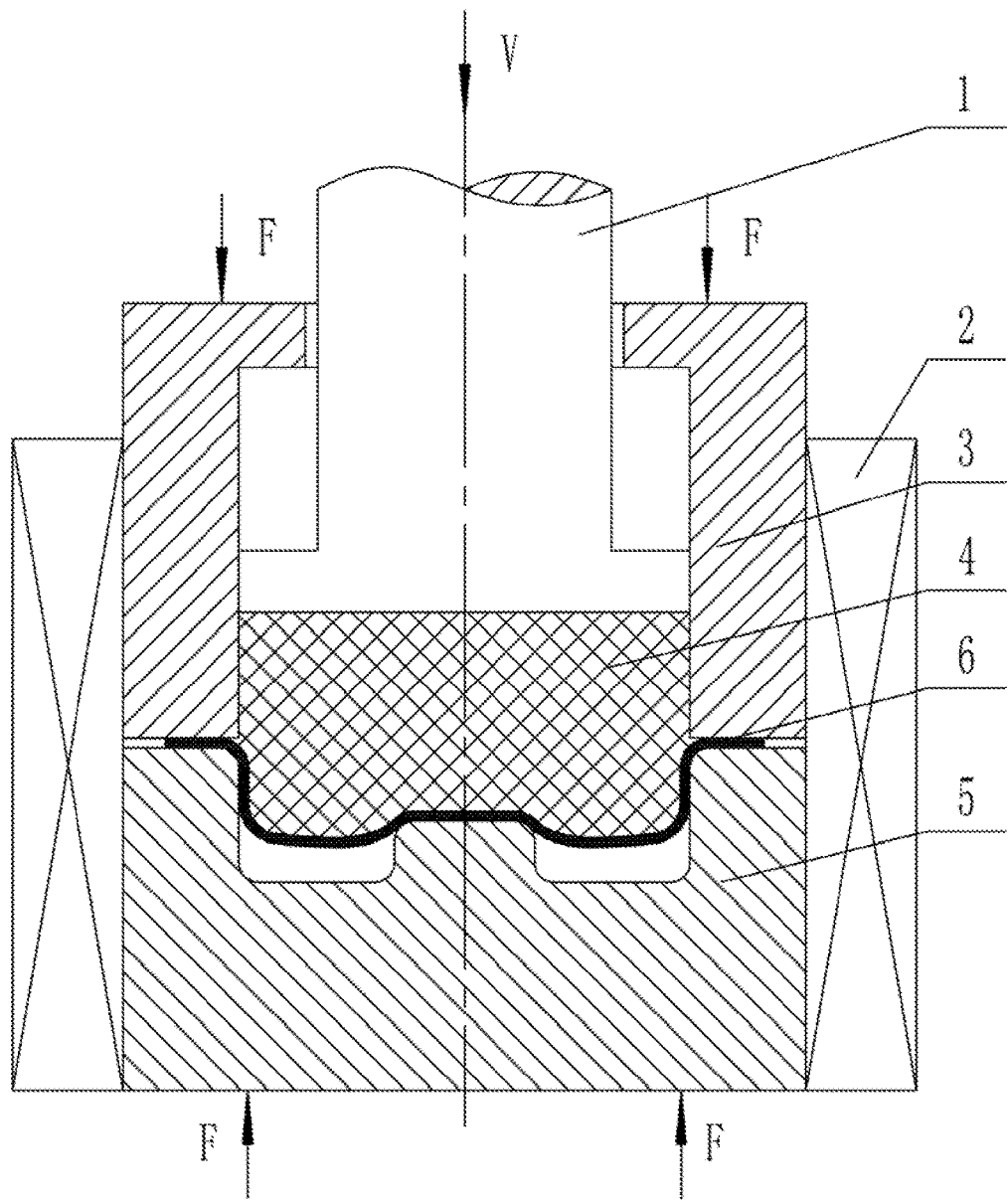
FIG. 3 is a sectional view of the forming apparatus according to the preferred embodiment of the present invention, illustrating a final stage of the deep drawing process.
Figure 4:
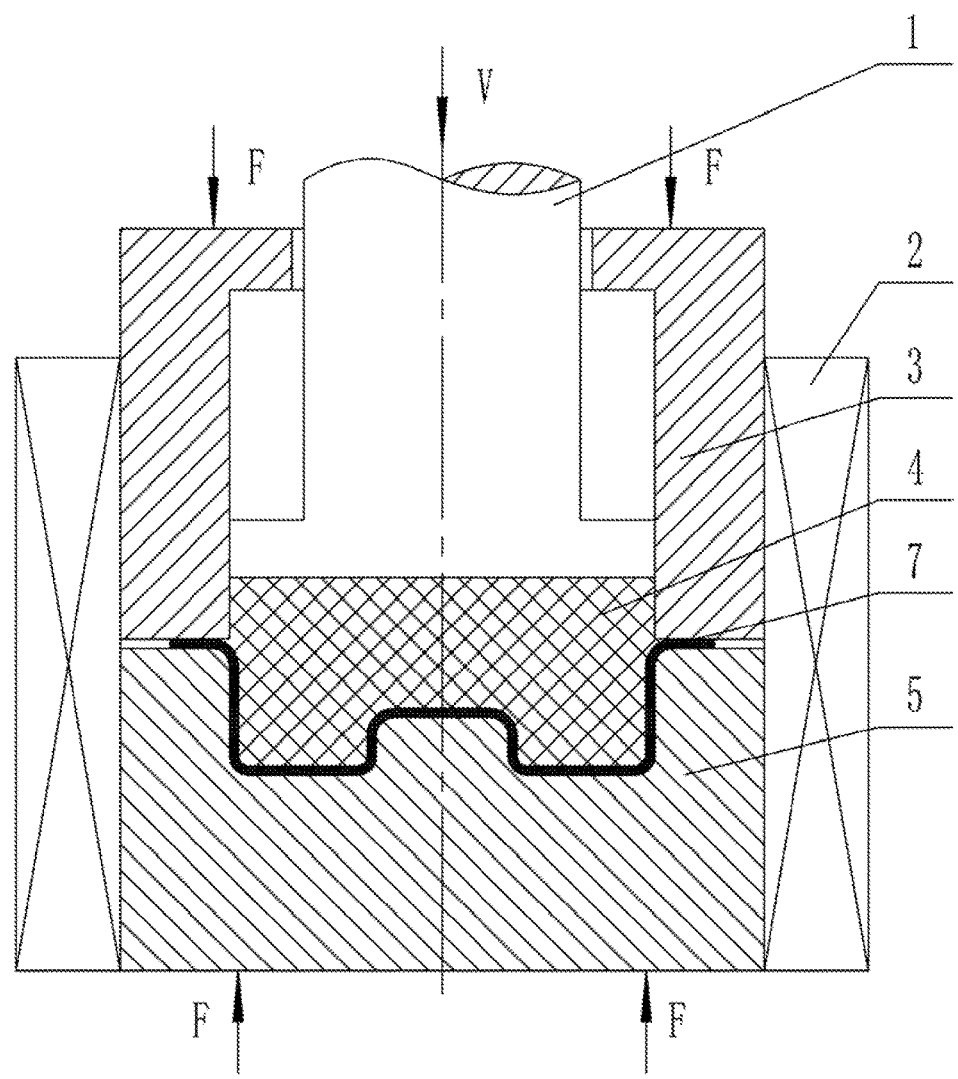
FIG. 4 is a sectional view of the forming apparatus according to a preferred embodiment of the present invention, illustrating that the deep drawing process is completed.

Embodiment 1: referring to FIG. 1 of the drawings, the forming apparatus of the present invention comprises a piston 1, a coil 2, an upper die 3 having a receiving cavity, a magnetorheological elastomer 4, and a lower die 5. The lower die 5 has a cavity 5-1 formed thereon. The upper die 3 is arranged to be overlappedly rested on top of the lower die 5. The piston 1 is movably received in the receiving cavity of the upper die 3, and is arranged to communicate with the cavity 5-1. The magnetorheological elastomer 4 is mounted at a lower portion of the piston 3, and is also received in the receiving cavity of the upper die 3. The coil 2 is provided and wounded on an exterior surface of the upper die 3 and the lower die 5.

Embodiment 2: referring to FIG. 1 of the drawings, embodiment 2 is structurally similar to embodiment 1 except that the piston 1, the upper die 3, and the lower die 5 are made of non-magnetic steel or austenitic stainless steel. The use of non-magnetic steel or austenitic stainless steel allows magnetic flux to penetrate the magnetorheological elastomer 4 so as to achieve uniform distribution of magnetic field in the receiving cavity.

Embodiment 3: referring to FIG. 1 to FIG. 4 of the drawings, the present invention provides a method of sheet metal forming using magnetorheological elastomer as a flexible-die. The method comprises the steps of:

Step 1: disposing a sheet blank onto a lower die 5 at a position between the lower die 5 and an upper die 3, wherein the sheet blank 6 is secured at a boundary between the lower die 5 and an upper die 3;

Step 2: determining a magnetic field strength B in the receiving cavity of the upper die 3 according to a cross sectional shape of the sheet blank 6 and a desirable elasticity modulus of the magnetorheological elastomer 4, where:

$$B = \mu_0 n I$$

In the above equation, $\mu_0$ is vacuum permeability, n is the number of turns for a unit length of the coil, I is current.

Note that the magnetic field strength B cannot exceed the saturation value of the magnetorheological elastomer 4. Step 3: connecting the coil 2 to an external direct current (DC) power source, and adjusting a current to alter the magnetic field developed in the receiving cavity of the upper die 3 so as to alter the elasticity modulus of the magnetorheological elastomer 4. The sheet blank 6 is deformed to the predetermined shape in turns under the action of magnetorheological elastomer 4 with a predetermined elasticity modulus. The current range of the externally applied DC is between 0 A and 20 A;

Step 4: removing the piston 1 and the upper die 3 from the lower die 5, and retrieving a final product from the cavity 5-1.

Embodiment 4: referring to FIG. 1 to FIG. 4 of the drawings, this embodiment specifies that the range of magnetic field strength B described in embodiment 2 is the range between approximately 0 T and approximately 0.6 T. Within that range, the magnetorheological elastomer 4 is capable of altering its mechanical properties, including the elasticity modulus.

Embodiment 5: referring to FIG. 1 to FIG. 4 of the drawings, the magnetorheological elastomer 4 described in step 2 of embodiment 2 is magnetorheological elastomer with silicone rubber or polyurethane rubber as polymeric material. The former is a material which consists of silicone rubber as a polymeric matrix with embedded micro-sized ferromagnetic particles. The latter is a material which consists of polyurethane rubber as a polymeric matrix with embedded micro-sized ferromagnetic particles. These two magnetorheological elastomer 4 have different elasticity modulus and can be selectively utilized to fit different performance targets of the resulting products.

Embodiment 6: referring to FIG. 1 to FIG. 4 of the drawings, the modules of elasticity of the magnetorheological elastomer 4 increases with increasing magnetic field strength B. The elasticity modulus of the magnetorheological elastomer 4 has a range between approximately 0.3 MPa and approximately 2.6 MPa. This range is suitable for forming sheet metal which has a relatively low material strength, such as aluminum, or for forming products which have a relatively simple structure. The other steps are the same as in embodiment 5.

Embodiment 7: referring to FIG. 1 to FIG. 4 of the drawings, the elasticity modulus of the magnetorheological elastomer 4 increases with increasing magnetic field strength B. The elasticity modulus of the magnetorheological elastomer 4 has a range between approximately 1.0 MPa and approximately 2.0 MPa. This range is suitable for forming sheet metal which has a relatively low material strength, such as aluminum, or for forming products which have a relatively simple structure. The other steps are the same as in embodiment 6.

Embodiment 8: referring to FIG. 1 to FIG. 4 of the drawings, the modules of elasticity of the magnetorheological elastomer 4 increases with increasing magnetic field strength B. The elasticity modulus of the magnetorheological elastomer 4 has a range between approximately 3.4 MPa and approximately 4.4 MPa. This range is suitable for forming sheet metal which has a relatively high material strength, such as stainless steel, or for forming products which have a relatively complicated structure. The other steps are the same as in embodiment 7.

Embodiment 9: referring to FIG. 1 to FIG. 4 of the drawings, the elasticity modulus of the magnetorheological elastomer 4 increases with increasing magnetic field strength B. The elasticity modulus of the magnetorheological elastomer 4 has a range between approximately 3.5 MPa and approximately 4.0 MPa. This range is suitable for forming sheet metal which has a relatively high material strength, such as stainless steel, or for forming products which have a relatively complicated structure. The other steps are the same as in embodiment 8.

Embodiment 10: referring to FIG. 1 to FIG. 4 of the drawings, step 3 comprises a step of adjustably reducing the externally applied DC so as to adjustably reduce the magnetic field strength B. When the magnetic strength B is reduced, the elasticity modulus of the magnetorheological elastomer 4 will reduce accordingly. The magnetorheological elastomer 4 will become relatively softer for fittedly contacting with the sheet blank 6. When the sheet blank 6 is partially formed to have a curved cross sectional shape, step 3 further comprises a step of adjustably increasing the externally applied DC so as to adjustably increase the magnetic field strength B. When the magnetic field strength B is increased, the elasticity modulus of the magnetorheological elastomer 4 will increase accordingly. The sheet blank 6 will then be formed such that it will touch a bottom surface of the cavity. After this, step 3 further comprises a step of adjustably reducing the externally applied DC so as to adjustably reduce the magnetic field strength B. As mentioned above, when the magnetic field strength B is reduced, the elasticity modulus of the magnetorheological elastomer 4 will reduce accordingly. The sheet blank 6 will fittedly attach on the lower die 5. Thus, during the entire forming process, the DC current is adjusted so as to adjustably alter the elasticity modulus of the magnetorheological elastomer 4. This allows the sheet blank 6 to flexibly and optimally deform in different stages of the forming process so as to increase the quality of the resulting product. The other steps are the identical to that disclosed in embodiment 3, embodiment 6 and embodiment 8.

What is claimed is:

1. A method of sheet flexible-die forming using magnetorheological elastomer as a flexible-die by a forming apparatus, wherein said forming apparatus comprises a piston, a coil, an upper die, a magnetorheological elastomer, and a lower die having a cavity formed thereon, said upper die being arranged to be overlappedly rested on top of said lower die, said piston being movably received in a receiving cavity of said upper die, said magnetorheological elastomer being mounted at a lower portion of said upper die and received in said receiving cavity of said upper die, said coil being provided and wound on an exterior surface of said upper die and said lower die, characterized in that, said method comprises the steps of:

(a) disposing a sheet blank onto said lower die at a position between said lower die and said upper die, wherein said sheet blank is secured at a boundary between said lower die and said upper die;

(b) determining a magnetic field strength B in said receiving cavity of said upper die according to a cross sectional shape of said sheet blank and an elastic modulus of said magnetorheological elastomer, where:

$B=\mu_0 nI$ where $\mu_0$ is vacuum permeability, n is the number of turns for a unit length of said coil, I is current, said magnetic field strength B not exceeding a saturation value of said magnetorheological elastomer;

(c) after step (a) and (b), connecting said coil to an external direct current power source, and altering said magnetic field developed in said receiving cavity of said upper die, altering the elastic modulus of said magnetorheological elastomer by a process of current adjustment-and simultaneously deforming said sheet blank to a predetermined shape under the action of said magnetorheological elastomer with a predetermined elastic modulus; and (d) removing said piston and said upper die from said lower die, and retrieving a final product, wherein said step (c) comprises the steps of: in the initial process of current adjustment, adjustably reducing said externally applied direct current so as to adjustably reduce said magnetic field strength B to slightly reduce said elastic modulus of said magnetorheological elastomer for causing said magnetorheological elastomer to soften for fittedly contacting with said sheet blank, then adjustably increasing said externally applied direct current so as to adjustably increase said magnetic field strength B to slightly increase said elastic modulus of said magnetorheological elastomer for making said sheet blank to fittedly touch a bottom surface of said cavity; and in the later process of current adjustment, adjustably reducing said externally applied direct current so as to adjustably reduce said magnetic field strength B to slightly reduce said elastic modulus of said magnetorheological elastomer, said sheet blank being fittedly attached on said lower die.

2. The method, as recited in claim 1, characterized in that, wherein said magnetorheological elastomer in said step (b) is silicone rubber-based or polyurethane rubber-based magnetorheological elastomer, wherein said elastic modulus of said magnetorheological elastomer with silicone rubber as polymeric material increases with increasing said magnetic field strength B, said elastic modulus of said magnetorheological elastomer has a range between approximately 0.3 MPa and approximately 2.6 MPa.

3. The method, as recited in claim 1, characterized in that, wherein said magnetorheological elastomer in said step (b) is silicone rubber-based or polyurethane rubber-based magnetorheological elastomer, wherein said elastic modulus of said magnetorheological elastomer with silicone rubber as polymeric material increases with increasing said magnetic field strength B, said elastic modulus of said magnetorheological elastomer has a range between approximately 3.4 MPa and approximately 4.4 MPa.

4. The method, as recited in claim 1, characterized in that, wherein said magnetic field strength B has a range between approximately 0 T and approximately 0.6 T, wherein said magnetorheological elastomer in said step (b) is silicone rubber-based or polyurethane rubber-based magnetorheological elastomer, wherein said elastic modulus of said magnetorheological elastomer with silicone rubber as polymeric material increases with increasing said magnetic field strength B, said elastic modulus of said magnetorheological elastomer has a range between approximately 0.6 MPa and approximately 2.6 MPa.

5. The method, as recited in claim 1, characterized in that, wherein said magnetic field strength B has a range between approximately 0 T and approximately 0.6 T, wherein said magnetorheological elastomer in said step (b) is silicone rubber-based or polyurethane rubber-based magnetorheological elastomer, wherein said elastic modulus of said magnetorheological elastomer with silicone rubber as polymeric material increases with increasing said magnetic field strength B, said elastic modulus of said magnetorheological elastomer has a range between approximately 3.4 MPa and approximately 4.4 MPa.

6. A method of sheet flexible-die forming by a forming apparatus, wherein the forming apparatus comprises a piston, a coil, an upper die, a magnetorheological elastomer and a lower die having a cavity formed thereon, wherein the upper die is arranged to be overlappedly rested on top of the lower die, the piston is movably received in a receiving cavity of the upper die, the magnetorheological elastomer is mounted at a lower portion of the upper die and received inside the cavity of the upper die, the coil is provided and wounded on an exterior surface of the upper die and the lower die, wherein the method of sheet flexible-die forming by a forming apparatus comprises the steps of:
 (a) disposing a sheet blank onto a boundary between the upper die and the lower die;
 (b) determining a magnetic field strength B in the receiving cavity of the upper die according to a cross sectional shape of the sheet blank and an elastic modulus of the magnetorheological elastomer, wherein the magnetic field strength B does not exceed a saturation value of the magnetorheological elastomer; and
 (c) after the step (a) and (b), carrying out a deforming process of the sheet blank by altering the elastic modulus of the magnetorheological elastomer through current adjustment of the coil such that the sheet blank is under the action of the magnetorheological elastomer with different elastic modulus during the deforming process, wherein in the step (c), during the deforming process, the elastic modulus of the magnetorheological elastomer is first decreased such that the magnetorheological elastomer is softened to fittedly contact the sheet blank, then the elastic modulus of the magnetorheological elastomer is increased such that the magnetorheological elastomer is hardened and the sheet blank is deformed to touch a bottom surface of a cavity of the lower die, then the elastic modulus of the magnetorheological elastomer is decreased such that the magnetorheological elastomer is softened to fittedly attach the sheet blank on the lower die.

* * * * *